United States Patent
Jones et al.

(10) Patent No.: US 12,408,669 B2
(45) Date of Patent: Sep. 9, 2025

(54) PLANT GROWTH REGULATORS

(71) Applicant: WinField Solutions, LLC, Arden Hills, MN (US)

(72) Inventors: Marcus Jones, Ankeny, IA (US); Cliff Watrin, Wyoming, MN (US)

(73) Assignee: WinField Solutions, LLC, Arden Hills, MN (US)

( * ) Notice: Subject to any disclaimer, the term of this patent is extended or adjusted under 35 U.S.C. 154(b) by 0 days.

(21) Appl. No.: 18/105,975

(22) Filed: Feb. 6, 2023

(65) Prior Publication Data

US 2023/0180759 A1 Jun. 15, 2023

Related U.S. Application Data

(63) Continuation of application No. 16/934,263, filed on Jul. 21, 2020, now Pat. No. 11,589,589.

(51) Int. Cl.
*A01N 43/90* (2006.01)
*A01N 43/12* (2006.01)
*A01N 43/38* (2006.01)

(52) U.S. Cl.
CPC ............. *A01N 43/90* (2013.01); *A01N 43/12* (2013.01); *A01N 43/38* (2013.01)

(58) Field of Classification Search
CPC ......... A01N 43/90; A01N 43/12; A01N 43/38
See application file for complete search history.

(56) References Cited

U.S. PATENT DOCUMENTS

| | | | |
|---|---|---|---|
| 4,169,717 A | 10/1979 | Ashmead | |
| 5,188,655 A | 2/1993 | Jones et al. | |
| 8,207,091 B2 * | 6/2012 | Stoller | A01N 43/90 504/138 |
| 10,104,883 B2 | 10/2018 | Stoller et al. | |
| 2015/0080216 A1 | 3/2015 | Wikeley et al. | |
| 2016/0198714 A1 | 7/2016 | Stoller et al. | |
| 2016/0295868 A1 | 10/2016 | Jones et al. | |
| 2020/0037610 A1 | 2/2020 | Jones | |

FOREIGN PATENT DOCUMENTS

| | | | |
|---|---|---|---|
| CN | 106538200 A | * | 3/2017 |
| IN | 201711011433 A | * | 7/2019 |

OTHER PUBLICATIONS

Patent Application Publication India 201711011433 A , 37 pp. (Year: 2019).*
Espacenet English translation CN106538200-A, 6 pp. (Year: 2022).*
Patent Application Publication India 201711011433A translation 37 pp. (Year: 2019).*
Winfield Solutions, LLC, "Ascend PRO—Plant Growth Regulator" Distributed by Winfield Solutions, LLC; Ascent® is a registered trademark of Winfield Solutions, LLC, publicly posted Feb. 19, 2019, 10 pages.
Espacenet English translation CN106538200, 6 pages, Year: 2022.
Patent Application Publication India 201711011433 A, 37 pages, Year: 2019.
International Search Report and Written Opinion for PCT Application No. PCT/US2021/041913, mailed Oct. 8, 2021 (13 pages).

* cited by examiner

*Primary Examiner* — June Hwu
(74) *Attorney, Agent, or Firm* — Padda Law Group

(57) ABSTRACT

Plant growth compositions include a mixture of inert compounds and an active component combination of auxin, gibberellin and cytokinin. The plant growth compositions are auxin-dominant, and the ratio of cytokinin to auxin in the active component combination ranges from about 1:10.5 to about 1:4.5. The amount of cytokinin ranges from about 3 to 19 wt % by weight of the active component combination in plant growth compositions formulated for in-furrow application to corn plants. Methods of improving plant growth involve in-furrow, seed and/or foliar application of one or more plant types with a plant growth composition. Improvements in plant growth include increases in the average number of bushels produced per acre.

15 Claims, 7 Drawing Sheets

PLANT GROWTH REGULATORS

TECHNICAL FIELD

Implementations relate to plant growth regulator compositions and methods of applying such compositions to plants. Particular implementations include auxin-dominant compositions configured for enhancing the performance of corn, soybean, cotton, wheat and/or other row crops.

BACKGROUND

Improving plant growth and development is a major focus of the agricultural industry. One approach to achieving robust growth involves applying growth stimulants to seeds and young plants. These substances may include plant growth regulators (PGRs), which can comprise combinations of plant hormones that promote cellular growth processes like mitosis, and other substances including, for example, biostimulants, biologicals, and plant extracts. Unfortunately for plant growers, weather and soil conditions around the time of planting can have severe, long-lasting effects on plant performance. Accordingly, improved PGR compositions are needed to improve plant growth regardless of the conditions at the time of planting and beyond.

SUMMARY

Implementations provide a plant growth composition comprising a mixture of inert compounds and an active component combination of an amount of auxin, an amount of gibberellin, and an amount of cytokinin. The amount of auxin can be dominant in the active component combination, and the ratio of cytokinin to auxin in the active component combination can be about 1:10.5 to about 1:4.5. In some examples, the ratio of cytokinin to gibberellin in the active component combination can be about 1:6 to about 5:4. In some embodiments, the ratio of gibberellin to auxin in the active component combination can be about 1:16 to about 3:5. The ratio of auxin to cytokinin and gibberellin together in the active component combination can be about 5:1 to about 3:2.

Implementations also provide a method of improving plant growth that involves applying a growth composition to plants or parts thereof and growing the plants to at least a vegetative growth stage. The plant growth composition can include a mixture of inert compounds and an active component combination of an amount of auxin, an amount of gibberellin, and an amount of cytokinin. The amount of auxin can be greater than the amount of gibberellin, and the amount of gibberellin can be greater than the amount of cytokinin. The amount of cytokinin can be 0.1 to 10 wt % by weight of the active component combination.

In some examples, the amount of cytokinin is about 3 to about 9 wt % by weight of the active component combination. In some embodiments, the amount of auxin is about 50 to about 70 wt % by weight of the active component combination. In some examples, the amount of gibberellin is about 30 to about 40 wt % by weight of the active component combination. In some embodiments, applying the growth composition comprises in-furrow and/or foliar application of the growth composition. In some embodiments, applying the growth composition comprises applying the growth composition to seeds of the plants. In some examples, the plants comprise corn plants. Improving growth of the plants can comprise increasing the number of plant bushels produced per acre relative to control plants not treated with the growth composition.

Implementations provide a plant growth composition comprising a mixture of inert compounds and an active component combination of an amount of auxin, an amount of gibberellin, and an amount of cytokinin. The amount of auxin can be greater than the amount of gibberellin, the amount of gibberellin can be less than the amount of cytokinin, and the amount of cytokinin can be about 10 to about 20 wt % by weight of the active component combination.

In some examples, the amount of auxin can be about 65 to about 80 wt % by weight of the active component combination. In some embodiments, the amount of gibberellin can be about 5 to about 15 wt % by weight of the active component combination.

Additional or alternative implementations provide a method of improving plant growth that involves applying a growth composition to plant seeds, plants or parts thereof and growing the plants to at least a vegetative growth stage. The growth composition can comprise a mixture of inert compounds and an active component combination of an amount of auxin, an amount of gibberellin, and an amount of cytokinin. The amount of auxin can be greater than the amount of gibberellin, the amount of gibberellin can be less than the amount of cytokinin, and the amount of cytokinin can be about 10 to about 20 wt % by weight of the active component combination.

In some examples, the amount of auxin can be about 65 to about 80 wt % by weight of the active component combination. In some embodiments, the amount of gibberellin can be about 5 to about 15 wt % by weight of the active component combination. In some examples, applying the growth composition can comprise in-furrow, seed and/or foliar application of the growth composition. In some embodiments, the plants can be soybean plants, corn plants, or both.

DETAILED DESCRIPTION

Figure 1:
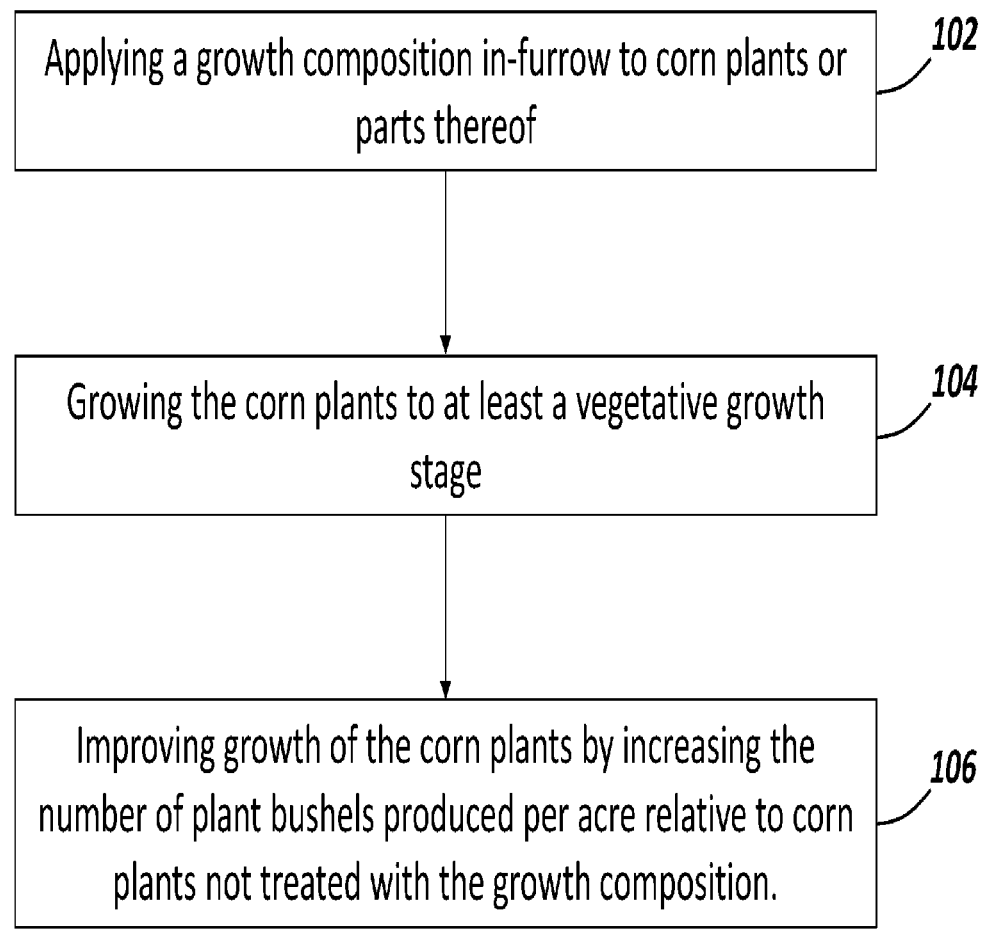
FIG. 1 is a flow diagram of a method of improving plant growth performed in accordance with embodiments of the present disclosure.

The PGR compositions provided herein can promote plant growth and development, and may be configured for in-furrow, seed and/or foliar application. Particular PGR compositions can include distinct amounts of active components including auxin, one or more gibberellins (e.g., gibberellic acid, $GA_4$ or $GA_7$) and/or cytokinin (e.g., kinetin), and may be formulated to stimulate the growth of corn or soybean plants in response to in-furrow application and/or seed application. The compositions have been optimized for promoting plant growth by experimentally assessing different ratios of PGR active components across many locations and climates. Among other enhancements, the compositions formulated in view of these experiments can improve plant resiliency, leading to consistent improvements in plant growth regardless of the environmental conditions at the time of planting. Implementations of the PGR compositions configured for in-furrow and/or seed application deviate from many preexisting PGR compositions by being auxin-dominant and in some cases, including little to no cytokinin. As used herein, "auxin-dominant" PGR compositions are compositions in which auxin is present at the highest weight percentage relative to the other active components, such as gibberellin and cytokinin.

PGR Compositions

The compositions provided according to the present disclosure include various amounts of PGRs, which may include but are not limited to auxins such as indole-3-butyric acid (IBA), gibberellins such as gibberellic acid, $GA_4$ and/or $GA_7$, and cytokinins such as kinetin. The PGRs may be blended in various combinations, such that each PGR can be considered a PGR component, which can be further combined with additional components, such as one or more excipients, solvents and adjuvants. The PGR compositions may be configured to stimulate specific plant growth processes, and even slight variations in a particular formulation may have a significant impact on plant performance. Example compositions include moderate to high amounts of auxin and little to no cytokinin.

Auxin plant hormones are produced mainly in and around growing regions on plant shoots. Auxins typically move from the shoots and roots in the phloem, and more slowly by cell-to-cell polar transport. Example effects elicited by auxins include apical dominance, tropisms, shoot elongation and root initiation. Natural deficiencies of zinc and/or phosphorus may inhibit auxin production in plants. Gibberellin plant hormones are also produced in root tips, and can be found in seeds, young stems and leaves. Gibberellins move from roots to shoots in the xylem and from leaves to shoots by cell-to-cell transport, promoting plant germination and cell elongation. Gibberellin production in plant roots and gibberellin movement to plant shoots can be inhibited by flooding. Cytokinin plant hormones are produced primarily in root tips. Seeds, young stems and leaves also may contain high levels of cytokinins, which are transported through the xylem from the roots to the shoots of a plant. Cytokinins promote cell division in shoot tissue, delay leaf senescence, and promote nodule development. Flooding, drought and high temperatures can inhibit cytokinin production and transport. Accordingly, the PGR components disclosed herein supplement these natural plant hormones and may drive specific physiological processes and may be inhibited by specific environmental phenomena.

Each PGR composition disclosed herein can include an active component combination that includes an auxin, at least one gibberellin, and/or a cytokinin. Of these three components, auxin may constitute the majority of the active component combination, and cytokinin may constitute the minority component. By including moderate to high amounts of auxin and low amounts of cytokinin, such compositions may differ from preexisting compositions recommended for in-furrow, seed and/or foliar application, which often include moderate to high amounts of cytokinin, such as greater than or approximately equal to 50 wt % of the total active component load. The ratio of auxin to the other active components may differ based on plant or application type. For example, auxin-dominant compositions in which cytokinin is the minority component may be tailored specifically for corn plants and/or in-furrow applications, whereas alternative embodiments can also include an active component combination in which auxin is dominant but gibberellin constitutes the minority component. Such embodiments may be formulated specifically for soybean plants and/or seed application.

Based on the weight of a given active component combination, specific examples of the disclosed PGR compositions formulated primarily for in-furrow corn plant treatment can include auxin in amounts ranging from about 50 to about 90 wt %, about 52 to about 80 wt %, about 54 to about 70 wt %, about 56 to about 65 wt %, about 58 to about 62 wt %, about 58 wt %, about 59 wt %, about 60 wt %, or about 61 wt %. The amount of gibberellin can range from about 10 to about 48 wt %, about 15 to about 46 wt %, about 20 to about 44 wt %, about 25 to about 42 wt %, about 30 to about 40 wt %, about 32 to about 38 wt %, about 34 to about 36 wt %, about 34 wt %, about 35 wt % or about 36 wt % based on the weight of the active component combination. The amount of cytokinin can range from about 0 to about 15 wt %, about 1 to about 10 wt %, about 2 to about 8 wt %, about 3 to about 7 wt %, about 4 to about 6 wt %, about 5 wt %, or about 6 wt % based on the weight of the active component combination. Because it may inhibit plant growth under certain conditions, some embodiments may exclude cytokinin entirely. A specific embodiment configured for in-furrow corn plant treatment may include about 59 wt % auxin, about 35 wt % gibberellic acid, and about 6 wt % cytokinin, for instance +/−2 wt %, based on the weight of the active component combination. The weight-for-weight percentage (wt %) of combined active components relative to the overall PGR composition, including various inert compounds, may range from about 0.1 to about 0.25 wt %, about 0.12 to about 0.23 wt %, about 0.14 to about 0.21 wt %, about 0.16 to about 0.19 wt %, about 0.17 to about 0.18 wt %, about 0.17 to about 0.175 wt %, or about 0.173 wt % in various examples.

Particular examples of the disclosed PGR compositions formulated primarily for seed application to soybean plants can include auxin in amounts ranging from about 50 to about 95 wt %, about 55 to about 90 wt %, about 60 to about 86 wt %, about 65 to about 82 wt %, about 70 to about 78 wt %, about 72 to about 76 wt %, about 73 wt %, about 74 wt %, or about 75 wt %. The amount of gibberellin can range from about 1 to about 20 wt %, about 3 to about 18 wt %, about 5 to about 16 wt %, about 7 to about 14 wt %, about 9 to about 11 wt %, about 10 wt %, about 11 wt %, about 12 wt %, or about 13 wt % based on the weight of the active component combination. The amount of cytokinin can range from about 0 to about 30 wt %, about 0 to about 25 wt %, about 0 to about 20 wt %, about 3 to about 19 wt %, about 6 to about 18 wt %, about 9 to about 17 wt %, about 12 wt % to about 16 wt %, about 10 wt %, about 11 wt %, about 12 wt %, about 13 wt %, about 14 wt %, about 15 wt %, or about 16 wt % based on the weight of the active component combination. Because it may inhibit plant growth under certain conditions, some embodiments may exclude cytokinin entirely. A specific embodiment configured for soybean seed treatment may include about 74 wt % auxin, about 10 wt % gibberellic acid, and about 16 wt % cytokinin, for instance +/−2 wt %, based on the weight of the active component combination. Another specific embodiment configured primarily for soybean seed treatment may include about 84 wt % auxin, about 5 wt % gibberellic acid, and about 11 wt % cytokinin, for instance +/−2 wt %, based on the weight of the active component combination. Another specific embodiment configured primarily for soybean seed treatment may include about 79 wt % auxin, about 5 wt % gibberellic acid, and about 16 wt % cytokinin, for instance +/−2 wt %, based on the weight of the active component combination. Another specific embodiment configured primarily for soybean seed treatment may include about 68 wt % auxin, about 11 wt % gibberellic acid, and about 21 wt % cytokinin, for instance +/−2 wt %, based on the weight of the active component combination. Another specific embodiment configured primarily for soybean seed treatment may include about 63 wt % auxin, about 11 wt % gibberellic acid, and about 26 wt % cytokinin, for instance +/−2 wt %, based on the weight of the active component combination. Another specific embodiment configured primarily for soybean seed treatment may include about 75 wt % auxin, about 12.5 wt % gibberellic acid, and about 12.5 wt % cytokinin, for instance +/−2 wt %, based on the weight of the active component combination. Another specific embodiment configured primarily for soybean seed treatment may include about 76 wt % auxin, about 12 wt % gibberellic acid, and about 12 wt % cytokinin, for instance +/−2 wt %, based on the weight of the active component combination. The weight-for-weight percentage of combined active components relative to the overall PGR composition, including a mixture of various inert compounds, may range from about 0.1 to about 0.26 wt %, about 0.12 to about 0.24 wt %, about 0.14 to about 0.22 wt %, about 0.16 to about 0.20 wt %, about 0.18 to about 0.20 wt %, or about 0.19 wt % in various examples.

Auxin may be dominant in the active component combination and the ratio of cytokinin to auxin may range from about 1:9 to about 1:10, about 1:10.5 or about 1:11, or may be about 1:2, about 1:2.4, about 1:2.5, about 1:3, about 1:4, about 1:4.5, about 1:5 to about 1:9, about 1:10 or about 1:10.5. The ratio of cytokinin to gibberellin may range from about 1:5 to about 1:6, or may be about 5:4, or about 3:1, the ratio of gibberellin to auxin may range from about 1:7 to about 1:16, or may be about 3:5, and the ratio of auxin to cytokinin and gibberellin together may range from about 3:4 to about 5:1, or may be about 1:2, or about 3:2. The aforementioned ratios may vary depending on whether a growth composition is being formulated for corn plants, soybean plants, in-furrow application, seed application and/or foliar application. For example, a growth composition formulated primarily for in-furrow application to corn plants, seeds and/or seedlings may include an active component combination in which the ratio of cytokinin to auxin is about 1:9, about 1:10, about 1:10.3 or about 1:11. The same growth composition may include a ratio of gibberellin to auxin of about 1:2, about 3:8, about 1:1.7 or about 2:3, and a ratio of cytokinin to gibberellin of about 1:5, about 1:6 or about 1:7. The ratio of auxin to cytokinin and gibberellin, together, may be about 3:2 or about 1:0.68. In some embodiments, one or more of the aforementioned ratios may also be utilized for treating soybean plants. The performance improvements caused by the application of PGR compositions comprising one or more of the aforementioned ratios of PGR components may be highly sensitive. For example, a PGR composition in which the ratio of cytokinin to auxin is 1:9 may perform significantly better than a PGR composition in which the ratio of cytokinin to auxin is 1:10, 1:8, or 1:11, for instance. The particular ratios of PGR components may also be specific to the disclosed PGR compositions, i.e., PGR compositions containing three PGR components (auxin, gibberellin and cytokinin) or at least two PGR components (auxin and gibberellin). As further described below, the precise PGR formulations disclosed herein were discovered through extensive experimentation conducted across a wide range of environmental conditions.

A separate growth composition formulated primarily for seed application to soybean plants may include an active component combination in which the ratio of cytokinin to auxin is about 1:8, about 1:6, about 1:5, about 1:4, about 1:2.4, about 1:3, about 2:5, about 3:1, about 2:7, about 2:9, about 2:13 or about 1:4.7. The same growth composition can include a ratio of gibberellin to auxin of about 1:6, about 1:7, about 1:9, about 1:10, about 1:16, about 1:15 or about 2:13, and a ratio of cytokinin to gibberellin of about 3:2, about 2:1, about 3:1, about 3:1.2 or about 1:0.7. The ratio of auxin to cytokinin and gibberellin, together, may be about 3:1, about 5:1, about 4:1, about 2:1 or about 1:0.36. As noted above, the PGR component ratios may be highly sensitive and specific to the disclosed PGR compositions, i.e., PGR compositions containing three PGR components (auxin, gibberellin and cytokinin) or at least two PGR components (auxin and gibberellin).

While auxin, gibberellin, and cytokinin may be referenced herein, it should be understood that such components embody classes of PGR compounds, and that specific subtypes of each PGR component may be utilized in particular embodiments. For example, the auxin may comprise indole-3-butyric acid (IBA), the gibberellin may comprise gibberellic acid ($GA_3$), $GA_4$ and/or $GA_7$, and the cytokinin may comprise kinetin. The more general class of each compound is often referenced herein for illustration purposes only, and should not be viewed as limiting.

The PGR compositions can further include one or more inert components or excipients in the form of adjuvants, solvents and/or surfactants, which may be formulated to improve the effectiveness of the active components by acting as diluents and/or carrier substances, for example. Together, the inert components or excipients may constitute an inert composition. Non-aqueous embodiments of the inert composition may specifically exclude water, which may be incompatible with or even detrimental to one or more of the PGR components. Non-aqueous embodiments of the inert composition may thus be critical for maximizing the effectiveness of the specific PGR components disclosed herein. Particular examples of the inert composition may exclude propylene glycol, along with one or more additional inert compounds. Alternative embodiments may include propylene glycol, for example at a reduced volume relative to preexisting inert compositions. Additional embodiments may include water, which may constitute a small portion, e.g., less than about 20 wt %, less than 10 wt %, between about 10 wt % and about 20 wt %, less than 5 wt % or less than 1 wt %, of the inert composition. Together, the inert components may constitute the majority (by wt %) of the total PGR composition, ranging in some embodiments from about 85 to about 99.9 wt %, about 90 to about 99.8 wt %, about 95 to about 99.8 wt %, about 98 to about 99.8 wt %, about 99 to about 99.7 wt %, about 99.5 to about 99.8 wt %, or about 99.6 to about 99.7 wt % by weight of the PGR composition.

Methods of Formulation

Methods of formulating the PGR compositions described herein can involve conducting one or more mixture experiments and evaluating the resulting compositions at various locations across different climates. In some examples, a mixture experiment can be designed to systematically evaluate the growth effects caused by various ratios of active components while maintaining the same total amount of the active components included in a given PGR composition. Maintaining identical active component loads advantageously isolates the growth effects caused by specific combinations of active substances, such that the growth response exhibited by the plants treated with the active substances can be attributed to the ratios of the individual PGR components instead of the total amount of the active component combination included in a PGR composition.

Embodiments may involve seeding, germinating and growing test plants and applying various PGR compositions to separate batches of plant seeds or alternatively to separate groups of plants via in-furrow and/or foliar application. Plant seeds, e.g., corn seeds or soybean seeds, can be planted in a growing medium, which may be deposited in a multicellular seedling tray. The planted seeds can be germinated in a controlled environment, which may be confined to a greenhouse or growth chamber. The conditions of the controlled environment may vary depending on seed type or on a particular set of targeted conditions, such as drought, long daylight, short daylight, or heavy rain. In some examples, the controlled environment may comprise a temperature of about 25 to about 35° C., about 27 to about 33° C., about 29 to about 31° C., or about 30° C. The humidity may also vary, ranging from about 45 to about 61%, about 47 to about 59%, about 49 to about 57%, about 51 to about 55%, or about 53%. An initial period of constant light, e.g., 24 hours, may be applied to the planted seeds, which may be watered at consistent intervals, e.g., daily, to facilitate germination. Alternatively, the seeds can be planted directly in an outdoor field plot at one or more locations, thereby subjecting the seeds, seedlings, and growing plants to natural weather conditions throughout the growing process.

The nascent plants can be allowed to grow to various growth stages, e.g., the V6, V9, VT, R1 or R6 growth stage, or at least a vegetative growth stage, at which point the plants can be measured for growth and developmental health. A vegetative growth stage can include a stage of growth beyond germination, at which point the plants have a root system capable of supporting plant growth, which may be evidenced by stem and/or leaf development, for example. Improved plant growth, development and/or maturity can be determined by measuring any or all differences in growth and/or yield relative to untreated plants or plants treated with different growth-promoting compositions. Measurements can be obtained on a per-plant basis or in the aggregate. Aggregate measurements can include bushels produced per acre, for instance. Indicators of corn plant growth, development and/or maturity acquired at later stages of growth can include, for example, seed output and/or ear prolificacy. The measurements acquired may depend on the growth stage targeted for improvement.

The methods of formulation and application described herein may be limited to one or more particular plant types, including but not limited to corn (maize), soybeans, cotton, wheat, barley, alfalfa, and other row crops. Corn plants may include Zea mays hybrids, inbreds, haploids, subspecies and varieties. In some examples, one or more of the aforementioned plant types may be excluded from the methods disclosed herein.

The PGR compositions driving the most consistently improved growth across a variety of environmental conditions can be identified. Environmental conditions can include warm weather, cold weather, drought, moderate to heavy rainfall, etc., and may be present at the time of planting and/or throughout at least a portion of the growing process.

Methods of Use

Methods of improving plant growth can involve applying an aforementioned PGR composition to a plant seed, plant part, whole plant, and/or the soil or other growth medium, e.g., vermiculite and/or one or more commercial growth products, into which a seed is planted in an amount sufficient to increase plant growth, development and/or yield. The PGR composition utilized for a particular application may be formed by combining the desired ratio of active components with one or more adjuvants, excipients and/or other components disclosed herein in the amounts described.

The total amount of active components added per quart of the total PGR composition may vary, ranging from about 0.05 to about 0.2 dry ounces, about 0.05 to about 0.1 dry ounces, about 0.05 to about 0.08 dry ounces, about 0.05 to about 0.06 dry ounces, about 0.055 to about 0.059 dry ounces, about 0.055 dry ounces, or about 0.059 dry ounces. The amount of each individual active component may also vary depending on the mode of application. For seed and/or in-furrow application, the amount of cytokinin may range from about 0 to about 0.04 dry ounces, about 0.004 to about 0.02 dry ounces, about 0.008 to about 0.015 dry ounces, or about 0.010 to about 0.012 dry ounces per quart of the total PGR composition. The amount of auxin may range from about 0.01 to about 0.134 dry ounces, about 0.01 to about 0.05 dry ounces, about 0.011 to about 0.04 dry ounces, about 0.011 to about 0.037 dry ounces, about 0.0112 dry ounces, about 0.02 dry ounces, about 0.04 dry ounces, or about 0.035 dry ounces per quart of the total PGR composition. The amount of gibberellin, such as gibberellic acid, may range from about 0.01 to about 0.134 dry ounces, about 0.01 to about 0.05 dry ounces, about 0.011 to about 0.04 dry ounces, about 0.011 to about 0.037 dry ounces, about 0.0112 dry ounces, about 0.02 dry ounces, about 0.04 dry ounces, or about 0.035 dry ounces per quart of the total PGR composition. For seed application, specifically, the amount of cytokinin may range from 0.02 to about 0.04 dry ounces, about 0.025 to about 0.035 dry ounces, about 0.028 to about 0.033 dry ounces, or about 0.03 to about 0.032 dry ounces per quart of the total PGR composition. The amount of auxin may range from about 0 to about 0.02 dry ounces, about 0.004 to about 0.016 dry ounces, about 0.008 to about 0.014 dry ounces, or about 0.010 to about 0.012 dry ounces per quart of the total PGR composition. The amount of gibberellin, e.g., gibberellic acid, may range from about 0.006 to about 0.026 dry ounces, about 0.01 to about 0.02 dry ounces, about 0.01 to about 0.012 dry ounces, about 0.014 to about 0.018 dry ounces, or about 0.015 to about 0.017 dry ounces per quart of the total PGR composition.

The PGR compositions can be utilized for seed treatment, in-furrow application and/or foliar application. For in-furrow application, a PGR composition can be applied to the growth medium, e.g., soil, into which the seed is planted. In-furrow application can be achieved using a furrow irrigation system delivering the PGR composition admixed with water. In some examples, a PGR composition comprising an active component combination that includes about 50 to about 90 wt % auxin, about 10 to about 48 wt % gibberellic acid, and about 0 to about 15 wt % cytokinin may be applied equally within each furrow of soil and/or growth medium into which each plant seed, e.g., corn seed, is sown. Seed or in-furrow application of the PGR composition may be performed prior to germination.

For seed application, a PGR composition can be applied to the plant seeds, for example via spraying, so that the seeds are completely or substantially coated with the PGR composition. The PGR composition may be applied to seeds in production settings and then the seeds may be provided to a planting site, or the plant growth composition may be applied to the seeds at the planting site. In some examples, a PGR composition comprising an active component combination that includes about 55 to about 90 wt % auxin, about 1 to about 20 wt % gibberellin, and about 0 to about 20 wt % cytokinin may be applied equally to each plant seed.

For foliar application, a PGR composition can be applied directly to the leaves, stem and/or flowers of each growing plant. In some examples a PGR composition comprising an active component combination that includes about 55 to about 90 wt % auxin, about 1 to about 20 wt % gibberellin, and about 0 to about 20 wt % cytokinin may be applied equally to each plant. In some examples, foliar application of the PGR composition may be employed at or before the V4 growth stage, only, while additional embodiments may continue foliar application of the PGR composition after the V4 growth stage, for example throughout the V5, V6, V9, VT or R1 growth stage.

Foliar and/or in-furrow applications can also involve spraying the treatment seeds, seedlings, and/or growing plants with a PGR composition. Usage rates may vary depending on the application type and plant type. For example, about 4.7 to about 6.3 fl. oz. per acre may be used for in-furrow treatment of corn. For direct seed treatment, about 1.05 to about 4.2 fl. oz. per hundredweight (cwt) may be used. Foliar application may involve applying about 10 mL of PGR solution to each plant. The PGR composition can be applied at consistent intervals, e.g., daily, or every 2 days, every 7 days, every 14 days, every 21 days, or any interval therebetween. In some embodiments, plants or plant parts, e.g., roots, may be submerged within an aqueous solution of a PGR composition for a certain period of time.

Improved plant performance achieved by applying the PGR compositions described herein may include increased seedling vigor, increased yield response, increased plant height, increased root density, increased plant biomass, and/or increased bushels per acre compared to preexisting PGR formulations. One performance improvement may be an increase in the average number of bushels/acre produced by plants treated with one or more of the disclosed PGR compositions relative to the number of bushels/acre produced by plants treated with one or more preexisting growth compositions. The per-acre increase in bushels produced may range from about 1.5 to about 7.0. This effect may be observed across multiple locations, including locations at which the average temperature at the time of planting is at least 60° F. The particular performance improvements achieved may depend on a variety of factors. For example, plant seeds and/or seedlings treated with a PGR composition containing high amounts of auxin and gibberellic acid relative to cytokinin may eventually exhibit increases in plant height, leaf turgidity and/or the number of plant bushels produced per acre relative to plants not treated with a disclosed growth composition. One or more of such improvements may be achieved early in plant development, for example at approximately the V4 growth stage, and may carry over throughout development.

FIG. 1 is a flow diagram of a method of improving plant growth performed in accordance with principles of the present disclosure. The example method 100 shows the steps that may be implemented, in any sequence, to improve plant performance by applying a particular PGR composition. In additional examples, one or more of the steps shown in the method 100 may be supplemented or omitted. For instance, in some examples, the improved plant growth embodied at step 106 may be achieved prior to the plant reaching maturity.

In the embodiment shown, the method 100 begins at block 102 by "applying a growth composition in-furrow to corn plants or parts thereof." As described in accordance with embodiments described herein, the growth composition may include a mixture of inert compounds and an active component combination of an amount of auxin, an amount of gibberellin, and an amount of cytokinin. The amount of auxin may be greater than the amount of gibberellin, the amount of gibberellin may be greater than the amount of cytokinin, and the amount of cytokinin may range from about 0.1 to 10 wt % by weight of the active component combination. In some examples, the ratio of cytokinin to auxin in the active component combination ranges from about 1:10 to about 1:5, inclusive. The method 100 continues at block 104 by "growing the corn plants to at least a vegetative growth stage." The method continues at block 106 by "improving growth of the corn plants by increasing the number of plant bushels produced per acre relative to corn plants not treated with the growth composition."

Figure 2:
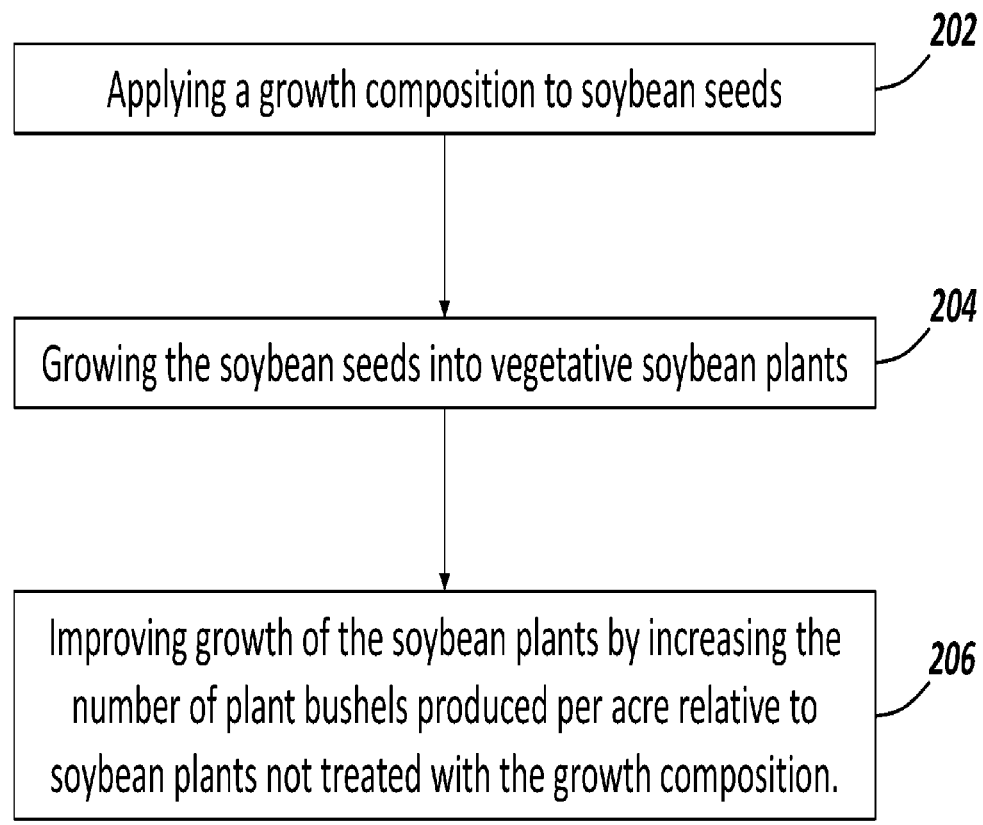
FIG. 2 is a flow diagram of another method of improving plant growth performed in accordance with embodiments of the present disclosure.

FIG. 2 is another flow diagram of a method of improving plant growth performed in accordance with principles of the present disclosure. The example method 200 shows the steps that may be implemented, in any sequence, to improve plant performance by applying a particular PGR composition. In additional examples, one or more of the steps shown in the method 200 may be supplemented or omitted. For instance, in some examples, the improved plant growth embodied at step 206 may be achieved prior to the plant reaching maturity, for example prior to the plants reaching the R6 growth stage.

In the embodiment shown, the method 200 begins at block 202 by "applying a growth composition to soybean seeds." As described in accordance with embodiments described herein, the growth composition may include a mixture of inert compounds and an active component combination of an amount of auxin, an amount of gibberellin, and an amount of cytokinin. The amount of auxin may be greater than the amount of gibberellin, the amount of gibberellin may be less than the amount of cytokinin, and the amount of cytokinin may range from about 10 to about 20 wt % by weight of the active component combination in some examples. The method 200 continues at block 204 by "growing the soybean seeds into vegetative soybean plants." The method continues at block 206 by "improving growth of the soybean plants by increasing the number of plant bushels produced per acre relative to soybean plants not treated with the growth composition."

The following experimental trials are for illustration purposes only, and should not be viewed as limiting.

EXAMPLES

Corn Plant Field Trials

The following field trials were conducted to evaluate the effects of single, two- and three-way PGR component mixtures on corn plant growth responsive to separate in-furrow and foliar applications. The PGR formulations included mixtures of an auxin (IBA), a cytokinin (kinetin) and/or gibberellin(s). The best-performing PGR formulations were compared to each other and to preexisting PGR formulations to eventually pinpoint the optimal combination of auxin, cytokinin and gibberellin(s) for improving corn plant performance.

Table 1 shows the proportion of cytokinin, auxin and gibberellin included in each of Treatments 1-9, the proportion of each active component ranging from 0.0 to 0.67 and totaling 1.0. As shown, Treatments 1-4 were evaluated via foliar application to growing corn plants, and Treatments 5-9 were evaluated via in-furrow application to corn seedlings. Notably, cytokinin constituted the smallest portion of each PGR formulation. The PGR formulations were either auxin-dominant, gibberellin-dominant, or contained equal proportions of auxin and gibberellin.

TABLE 1

| Treatment | Application Type | CYK | AUX | GIB | Active Blend |
|---|---|---|---|---|---|
| 1 | foliar | 0.20 | 0.60 | 0.20 | 3-way AUX dominant |
| 2 | foliar | 0.33 | 0.55 | 0.12 | 3-way AUX dominant |
| 3 | foliar | 0.24 | 0.64 | 0.12 | 3-way AUX dominant |
| 4 | foliar | 0.14 | 0.74 | 0.12 | 3-way AUX dominant |
| 5 | in-furrow | 0.00 | 0.67 | 0.33 | 2-way AUX-GIB |
| 6 | in-furrow | 0.00 | 0.33 | 0.67 | 2-way AUX-GIB |
| 7 | in-furrow | 0.20 | 0.20 | 0.60 | 3-way GIB dominant |
| 8 | in-furrow | 0.07 | 0.46 | 0.47 | 3-way AUX-GIB |
| 9 | in-furrow | 0.07 | 0.58 | 0.35 | 3-way AUX dominant |

By separately treating different corn plants with the PGR compositions represented in Table 1, the effects of various combinations of active PGR components were elucidated and compared to preexisting treatments of Ascend® SL or Ascend® Pro (each sold by Winfield® United). Ascend® SL includes an active component combination comprised of about 0.090 wt % cytokinin (kinetin), about 0.030 wt % gibberellic acid, and about 0.045 wt % auxin (indole butyric acid) based on the weight of the overall PGR composition. Ascend® Pro includes an active component combination comprised of 0.090 wt % cytokinin (kinetin), about 0.030 wt % gibberellins ($GA_4$+$GA_7$), and about 0.045 wt % auxin (indole-3-butyric acid) based on the weight of the overall PGR composition. It was determined that in-furrow treatment worked best to enhance plant performance, and thus provided the most promising route for further evaluation.

The results of applying Treatments 5-9 in-furrow at 19 locations across the Midwest are shown below in Table 2. Each treatment was provided concurrently with OptiStart®/Local Pro (sold by Winfield® United).

TABLE 2

| Treatment | Mean Effect | Locations | Wins | % Win | Average Win | P value |
|---|---|---|---|---|---|---|
| 5 | 1.8 | 19 | 11 | 57.9 | 4.6 | 0.088 |
| 6 | 2.4 | 19 | 14 | 73.7 | 5.1 | 0.082 |
| 7 | 0.0 | 19 | 9 | 47.4 | 5.0 | 0.990 |
| 8 | 0.9 | 19 | 9 | 47.4 | 6.4 | 0.568 |
| 9 | 2.6 | 19 | 14 | 73.7 | 5.4 | 0.258 |

Table 2 shows that Treatments 6 and 9 caused the highest mean effect of in-furrow experimental candidates based on the average number of bushels produced per acre by the plants in the study. Treatment 6 caused an average increase in the number of bushels produced per acre by +2.4 relative to Ascend® SL, and Treatment 9 caused an average increase in the number of bushels produced per acre by +2.6 relative to Ascend® SL. Win rates, defined by the number of locations at which the treatments resulted in improvements to plant performance relative to Ascend® SL, were over 70% for both Treatment 6 and Treatment 9. For the locations at which the test treatments outperformed Ascend® SL, the average marginal increase in plant performance measured over 5 bushels/acre.

Treatments 6 and 9 were further evaluated by comparing the two formulations head-to-head. Each treatment was applied in-furrow to corn plants concurrently with OptiStart®/Local Pro at 23 locations across the Midwest. As shown below in Table 3, Treatment 9 outperformed Treatment 6 by producing more bushels per plant (+2.4) and by generating more wins (16 versus 12) and a greater win percentage (69.6%).

TABLE 3

| Treatment | Mean Effect | Locations | Wins | % Win | Average Win | P value |
|---|---|---|---|---|---|---|
| 6 | 0.0 | 23 | 12 | 52.2 | 7.1 | 0.994 |
| 9 | 2.4 | 23 | 16 | 69.6 | 6.7 | 0.237 |

Figure 3:
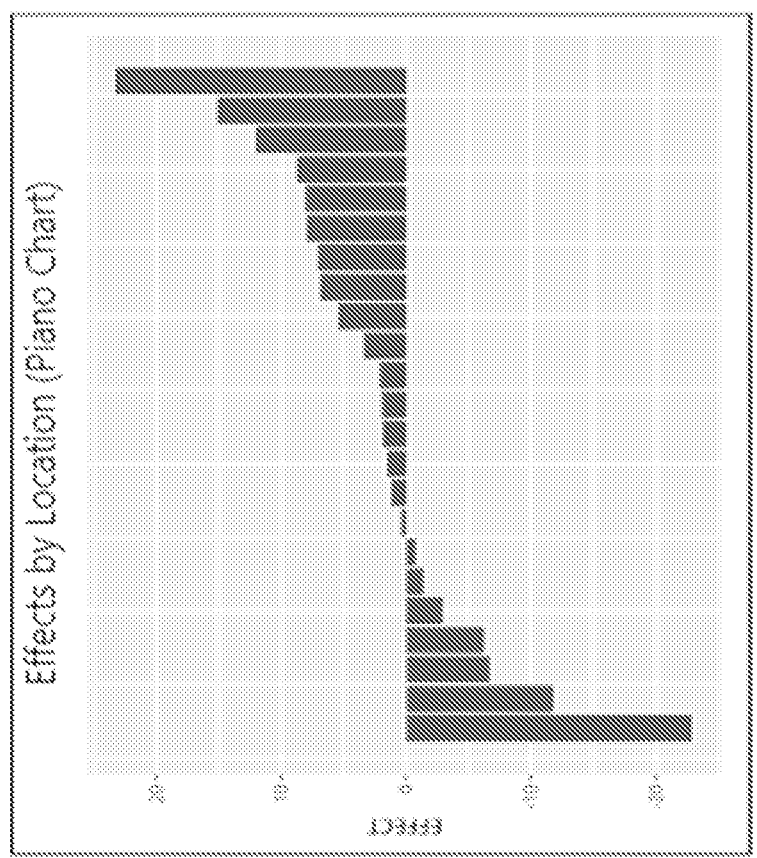
FIG. 3 is a graphical representation of growth improvements achieved in corn plants grown in numerous locations in response to treating the plants using the growth regulator compositions disclosed in accordance with embodiments of the present disclosure.
Figure 3:
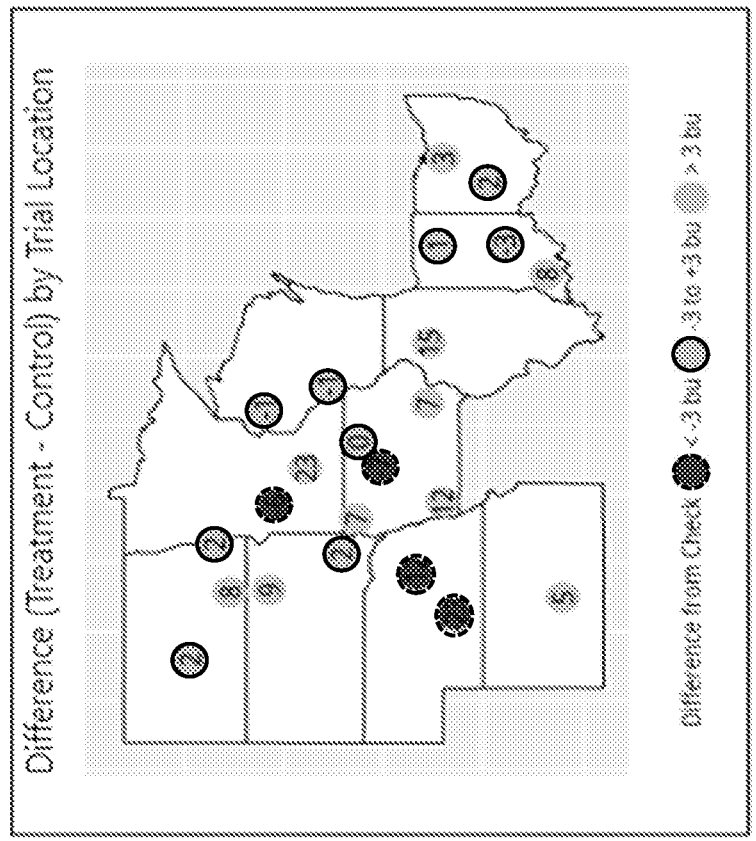

Based on the aforementioned results, Treatment 9 was selected for further testing, this time relative to Ascend® Pro by applying the treatments in-furrow to separate corn plants in 23 locations spread across North Dakota, South Dakota, Nebraska, Kansas, Iowa, Minnesota, Wisconsin, Illinois, Indiana and Ohio. OptiStart®/Local Pro was again provided concurrently with the treatments. The results are represented graphically in FIG. 3. Positive numbers on the map indicate locations at which Treatment 9 outperformed Ascend® Pro, with the numbers representing the average difference in bushels/acre produced at each location. The piano chart on the right also shows the mean effect (bushels/acre) at each location. The 0 mark on the y-axis represents an equal effect between Treatment 9 and Ascend® Pro, such that the positive bars represent locations at which Treatment 9 outperformed Ascend® Pro. As shown in FIG. 3, Treatment 9 outperformed Ascend® Pro about 70% of the time by an average of +6.7 bushels/acre, or in 16 of the 23 locations used for testing. The mean effect across all locations was +2.4 bushels in favor of Treatment 9.

Figure 4:
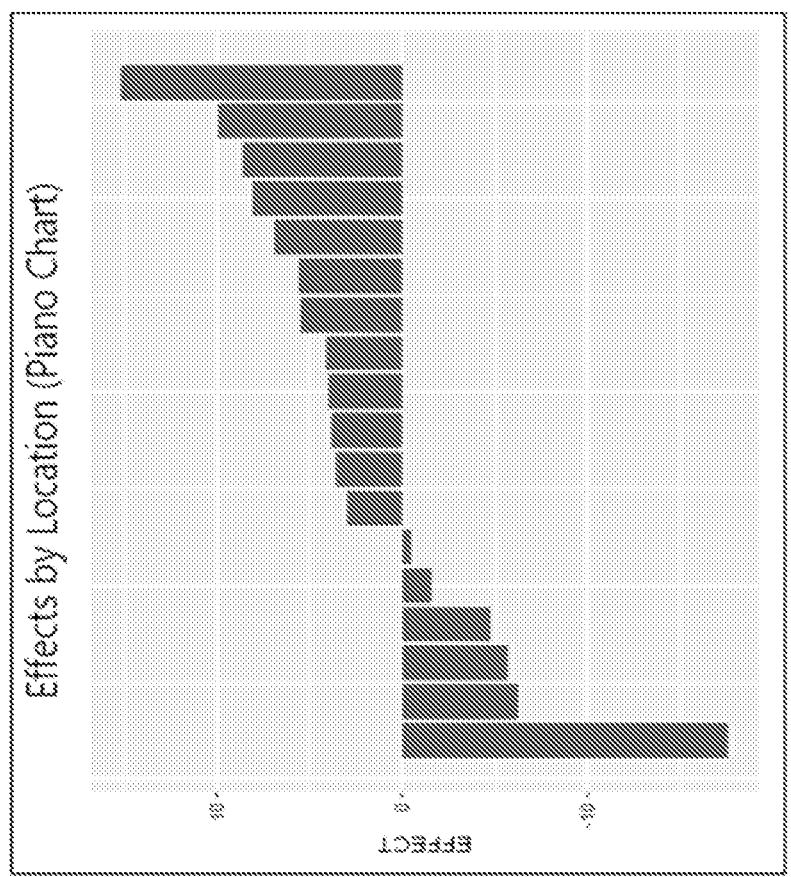
FIG. 4 is another graphical representation of growth improvements achieved in corn plants grown in numerous locations in response to treating the plants using such growth regulator compositions disclosed herein.
Figure 4:
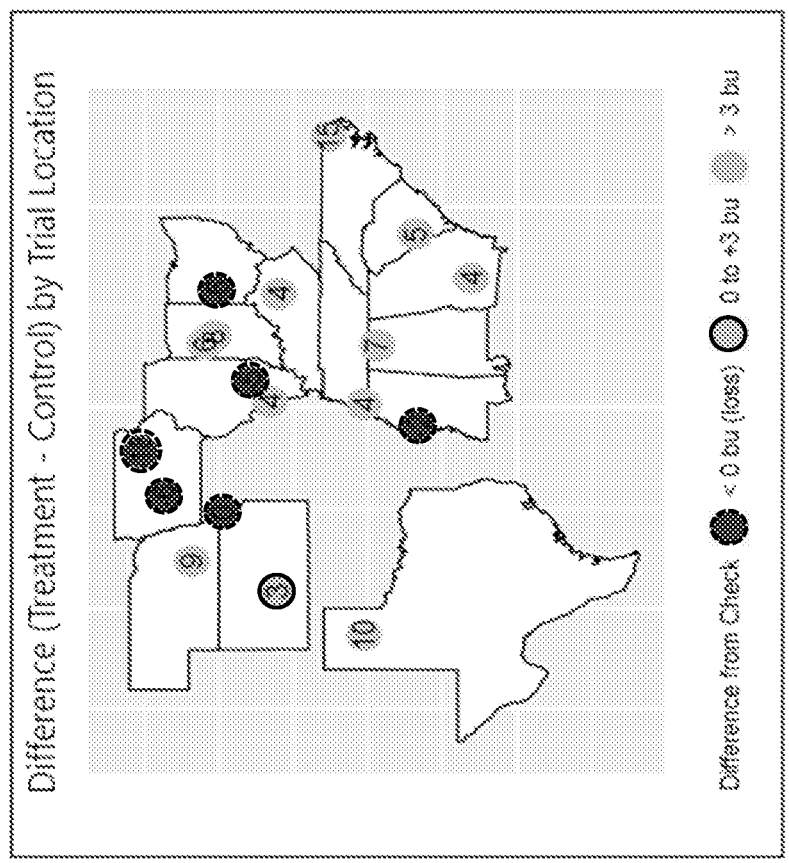

Treatment 9 was then evaluated in-furrow against Ascend® Pro at 18 locations spread across comparatively warmer locations in Nebraska, Kansas, Texas, Iowa, Illinois, Indiana, Ohio, Kentucky, Tennessee, Alabama, Arkansas, Georgia, South Carolina and North Carolina. The results are shown in FIG. 4, which like FIG. 3, includes positive numbers on the map at locations where Treatment 9 outperformed Ascend® Pro. The chart on the right again shows the mean effect (bushels/acre) at each location. As shown, Treatment 9 outperformed Ascend® Pro by an average of +2.3 bushels/acre across all locations, and in the 67% of locations in which Treatment 9 outperformed Ascend® Pro, it did so by an average of +6.5 bushels/acre.

Figure 5:
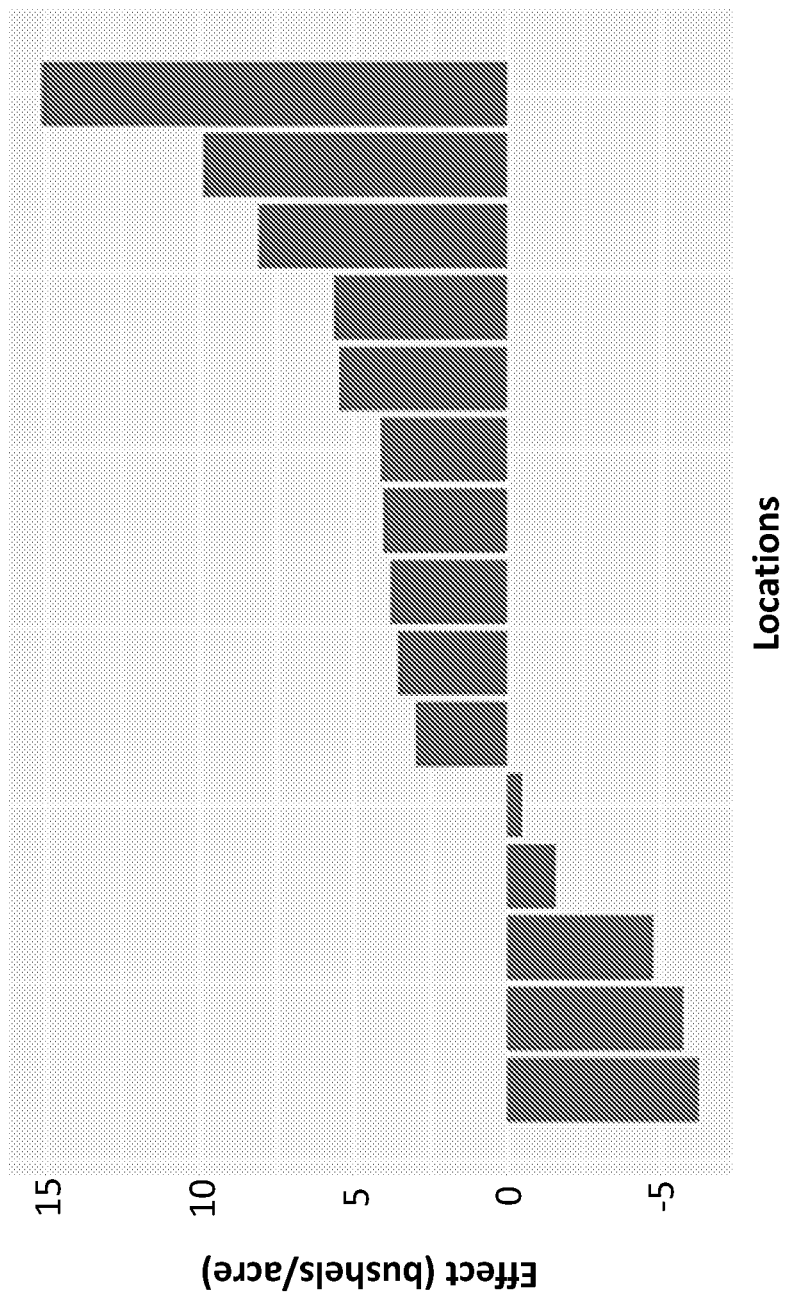
FIG. 5 is another graphical representation of growth improvements achieved in corn plants grown in numerous locations in response to treating the plants using such growth regulator compositions disclosed herein.

Similar field trials were performed again in exclusively warm environments to further determine the extent of corn plant performance increases caused by in-furrow application of Treatment 9 versus Ascend® Pro. To qualify as a warm environment, the temperature at each testing site was at least 60° F. at the time of planting. As shown in the graph of FIG. 5, Treatment 9 outperformed Ascend® Pro by an average of +2.9 bushels/acre, and in the 10 of the 15 cases in which Treatment 9 outperformed Ascend® Pro, it did so by an average of +6.5 bushels/acre. These results are consistent with the observation that Treatment 9 may consistently outperform Ascend® Pro in warm environments.

Soybean Plant Field Trials

The following field trials were conducted to evaluate the effects of three-way PGR component mixtures on soybean plant growth responsive to seed application. The PGR formulations included mixtures of an auxin (IBA), a cytokinin (kinetin) and gibberellin(s). The best-performing PGR formulations were compared to each other and to preexisting PGR formulations to eventually pinpoint the optimal combination of auxin, cytokinin and gibberellin(s) for improving soybean plant performance.

Novel Treatments 1 and 2 were evaluated against commercially available products including Ascend® WSG, Warden® CX, Ascend® Pro and Ascend® SL (each sold by Winfield® United), by treating separate soybean seeds with one of each PGR composition, growing the plants to at least a vegetative growth stage, and counting the number of bushels produced per acre. Treatment 1 included an active component combination of 74 wt % auxin, 14 wt % cytokinin and 12 wt % gibberellin. Treatment 2 included an active component combination of 47 wt % gibberellin, 46 wt % auxin and 7 wt % cytokinin.

Figure 6:
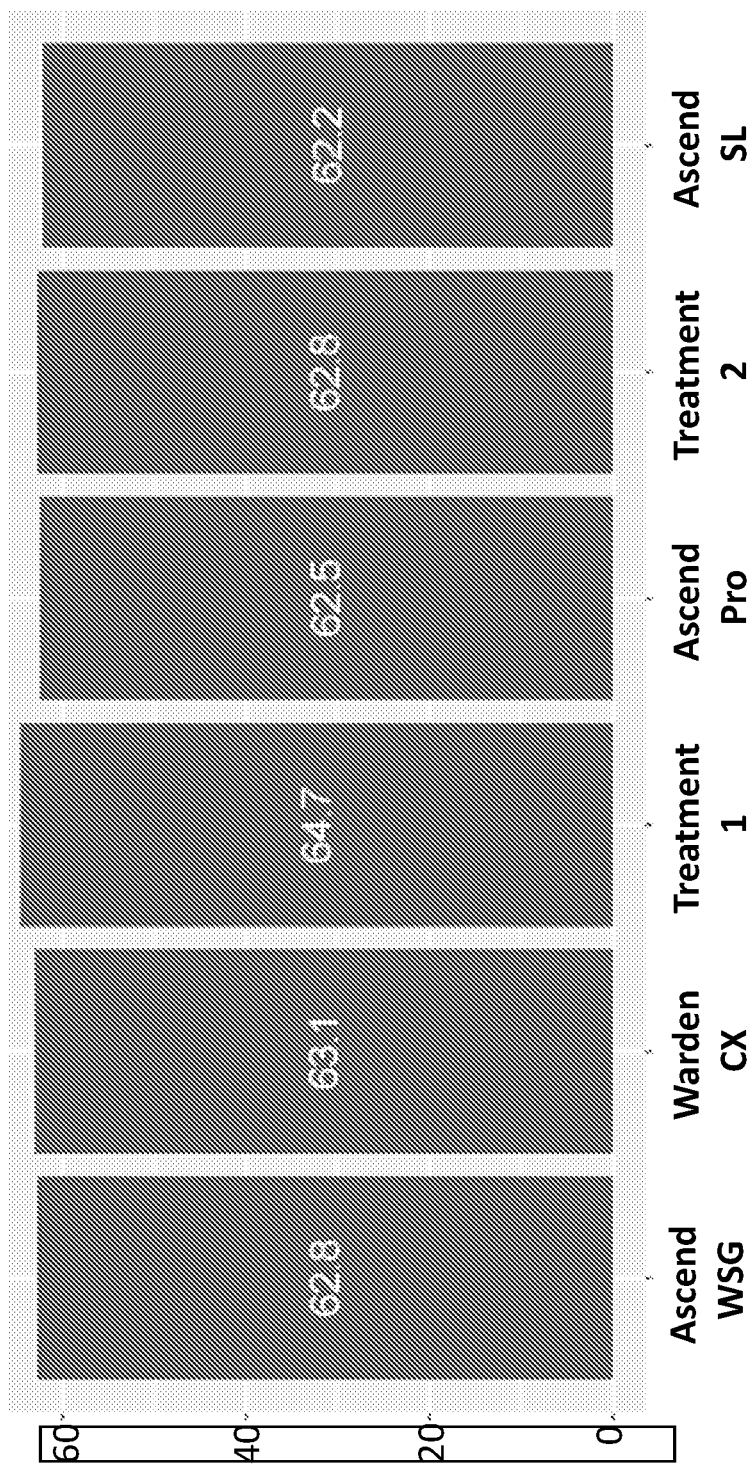
FIG. 6 is a graphical representation of growth improvements achieved in soybean plants using such growth regulator compositions disclosed herein.

As shown in FIG. 6, seed application of Treatment 1 resulted in the greatest number of bushels/acre, at 64.7, which constituted a statistically significant marginal increase in bushels/acre relative to the other treatments. Warden® CX came in second by causing an average production of 63.1 bushels/acre, followed by Treatment 2 and Warden® CX (62.8 bushels/acre).

Figure 7:
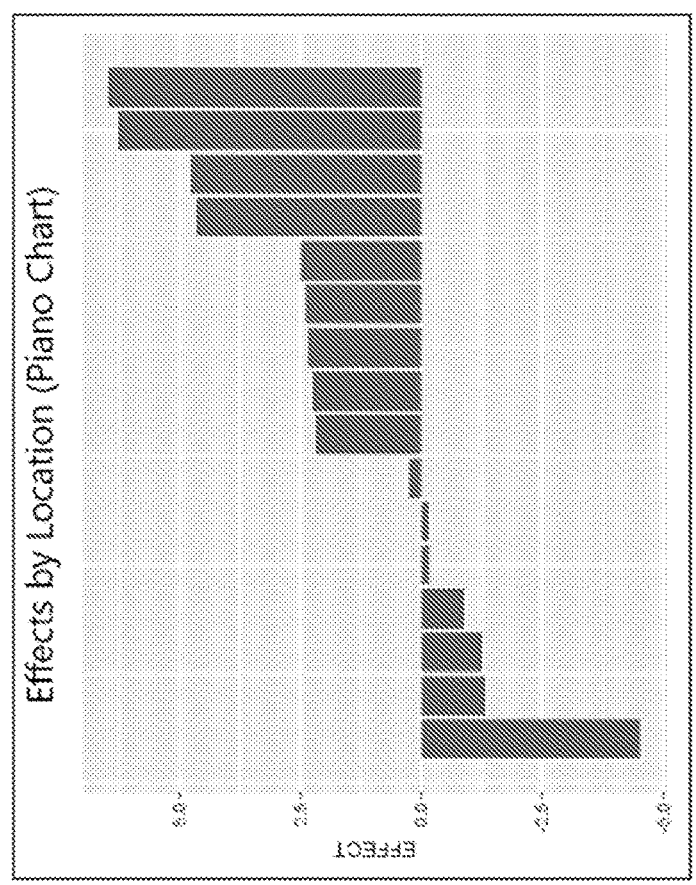
FIG. 7 is a graphical representation of growth improvements achieved in soybean plants grown in numerous locations in response to treating the soybean seeds using such growth regulator compositions disclosed herein.
Figure 7:
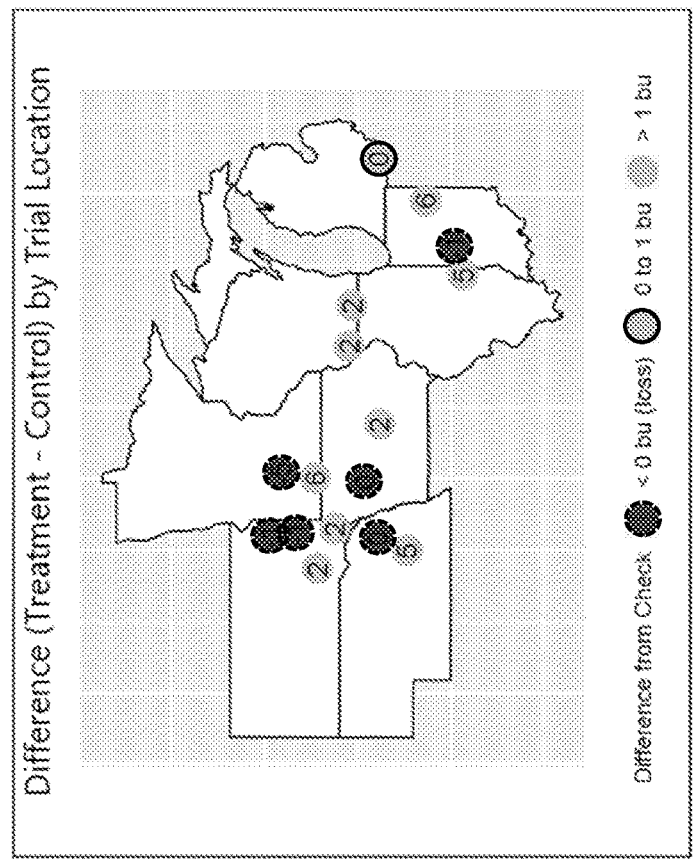

Treatment 1 was then combined with Wardenx CX and the resulting combination evaluated against Warden® CX, alone, at 16 locations across South Dakota, Nebraska, Minnesota, Iowa, Illinois, Wisconsin, Indiana and Michigan. The results are shown in FIG. 7. As shown, the combination of Treatment 1 and Warden® CX outperformed Warden® CX by an average of +1.6 bushels/acre, outperforming Warden® CX in 62.5% of the locations. At the locations where the combination of Treatment 1 and Warden® CX outperformed Warden® CX, the average marginal increase in bushels/acre measured +3.4. These data indicate that seed treatment application of Treatment 1, alone or in combination with Warden® CX, may drive a significant increase in the number of soybean bushels produced per acre compared to preexisting growth-promoting compositions.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or components used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A plant growth composition comprising:
   a mixture of inert compounds; and
   an active component combination of an amount of auxin, an amount of gibberellin, and an amount of cytokinin,
   wherein the amount of auxin comprises more than the about of gibberellin plus the amount of cytokinin,
   wherein the amount of cytokinin comprises about 3 to about 19 wt %,
   wherein a ratio of cytokinin to auxin in the active component combination is about 1:10.5 to about 1:4.5, and
   wherein the plant growth composition increases plant yield.

2. The composition of claim 1, wherein the amount of cytokinin comprises about 6 to about 18 wt %.

3. The composition of claim 2, wherein a ratio of gibberellin to auxin in the active component combination is about 1:7 to about 1:16.

4. The composition of claim 2, wherein a ratio of cytokinin to gibberellin in the active component combination is about 1:6 to 5:4.

5. A method of improving plant growth, the method comprising:
   applying a growth composition to plants or parts thereof, the growth composition comprising:
     a mixture of inert compounds; and
     an active component combination of an amount of auxin, an amount of gibberellin, and an amount of cytokinin,
       wherein the amount of auxin is greater than the amount of gibberellin plus the amount of cytokinin, and
       wherein a ratio of cytokinin to auxin in the active component combination is about 1:10.5 to about 1:4.5, and
   growing the plants to at least a vegetative growth stage, thereby improving yield of the plants.

6. The method of claim 5, wherein the amount of cytokinin is about 3 to about 9 wt % by weight of the active component combination.

7. The method of claim 5, wherein the amount of auxin is about 50 to about 70 wt % by weight of the active component combination.

8. The method of claim 5, wherein the amount of gibberellin is about 30 to about 40 wt % by weight of the active component combination.

9. The method of claim 5, wherein applying the growth composition comprises in-furrow and/or foliar application of the growth composition.

10. The method of claim 5, wherein applying the growth composition comprises applying the growth composition to seeds of the plants.

11. The method of claim 5, wherein the plants comprise corn plants.

12. The method of claim 5, wherein improving growth of the plants comprises increasing the number of plant bushels produced per acre relative to control plants not treated with the growth composition.

13. A plant growth composition comprising:
   a mixture of inert compounds; and
   an active component combination of an amount of auxin, an amount of gibberellin, and an amount of cytokinin,
      wherein the amount of auxin is greater than the amount of gibberellin plus the amount of cytokinin,
      wherein a ratio of cytokinin to auxin in the active component combination is about 1:10.5 to about 1:4.5,
      wherein the amount of cytokinin is about 3 to about 9 wt % by weight of the active component combination, and
      wherein the plant growth composition increases plant yield.

14. The composition of claim 13, wherein the amount of auxin is about 50 to about 70 wt % by weight of the active component combination.

15. The composition of claim 13, wherein the amount of gibberellin is about 30 to about 40 wt % by weight of the active component combination.

\* \* \* \* \*